July 2, 1929.  R. S. BLAIR  1,719,646
CONSTRUCTION FOR MOTOR VEHICLE FENDERS
Filed Jan. 29, 1925
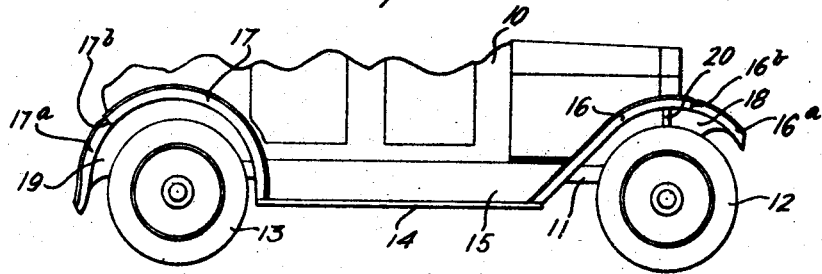
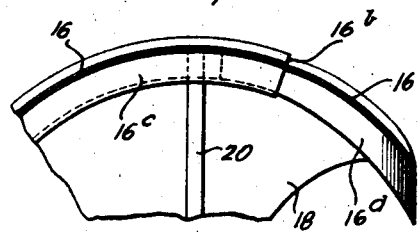
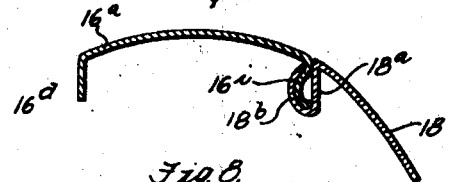
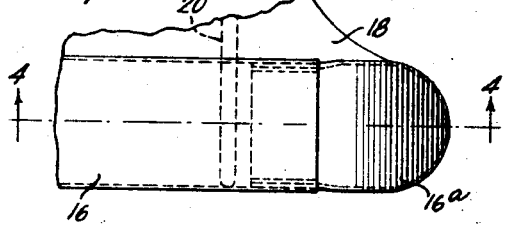
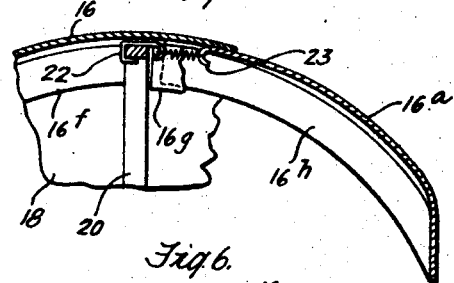
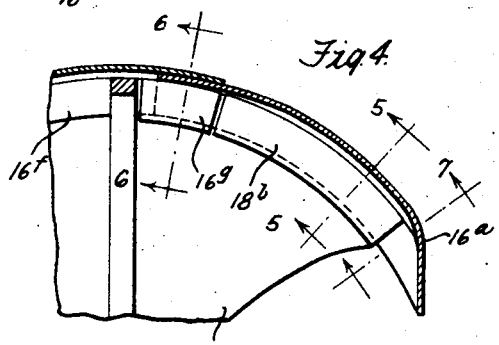
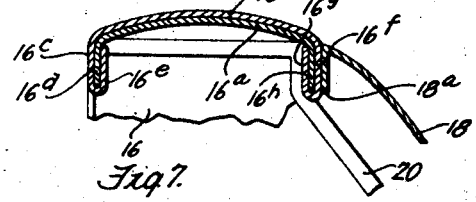
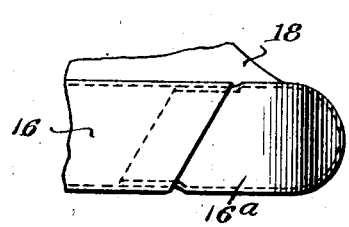
INVENTOR
Robert S. Blair Patented July 2, 1929.

1,719,646

UNITED STATES PATENT OFFICE.

ROBERT S. BLAIR, OF STAMFORD, CONNECTICUT.

CONSTRUCTION FOR MOTOR-VEHICLE FENDERS.

Application filed January 29, 1925. Serial No. 5,466.

This invention relates to fender or mudguard construction for motor vehicles.

One of the objects of the invention is to provide a construction of the above nature adapted materially to reduce the waste of material and cost involved in the repair or replacement of damaged automobile mudguards or fenders. Another object is to provide a fender construction wherein the parts most frequently damaged may conveniently be restored without necessitating replacement of the entire fender. Another object is to provide a fender construction of the above nature which is neat and attractive in appearance and free from danger of vibration and rattling. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which are shown one or more various possible embodiments of this invention, Figure 1 is a diagrammatic side elevation of a motor car;

Figure 2 is a fragmentary side elevation of the end portion of a fender;

Figure 3 is a top plan view of the fender portion shown in Fig. 2;

Figure 4 is a longitudinal section taken substantially along the line 4—4 of Fig. 3;

Figure 5 is a transverse section taken substantially along the line 5—5 of Fig. 4;

Figure 6 is a transverse section taken substantially along the line 6—6 of Fig. 4;

Figure 7 is a transverse section taken substantially along the line 7—7 of Fig. 4;

Figure 8 is a longitudinal section similar to Fig. 4 showing certain parts omitted from Fig. 4, and Figure 9 is a plan view similar to Fig. 3 showing a slightly modified form.

Similar reference characters refer to similar parts throughout the several views of the drawing.

Referring now to the drawing in detail, there is diagrammatically represented a side elevation of an automobile showing the body 10 mounted upon the frame 11, a front wheel 12 and a rear wheel 13. As in the usual automobile construction there extends along the side of the body between the front and rear wheels a running board or step 14, between which and the body is the usual longitudinal pan or apron 15 adapted to conceal the under portion of the car and prevent mud from splashing outwardly from beneath the car onto the running board. From the two ends of the running board 14 extend fenders or mud guards 16 and 17, respectively, arching over the front and rear wheels of the car. To prevent mud from splashing from the wheels 12 and 13 against the sides of the body 10 there is interposed between the inside edge of the forward fender 16 and the frame 11 an apron 18, and between the inside edge of the rear portion of the rear fender 17 and the rear portion of the body 10 an apron 19. The rear fender 17 is secured in the usual manner against the side of the rear portion of the body or against the frame, and the forward fender 16 is supported by a suitable bracket 20 extending upwardly from the frame.

The end portions of these fenders or mud guards 16 and 17 projecting over the wheels of the automobile, are in an exposed position upon the vehicle and are frequently damaged and bent by collision with various objects and interference with other vehicles upon the road. It is ordinarily found that these projecting ends of the fenders are the portions of the motor vehicle most frequently damaged. A bending and crumpling up of these fender end portions moreover generally results in a bending and crumpling of the fender at some other portion thereof, thus damaging the fender to such an extent that it is rendered unfit for further use and necessitating replacement by a new fender.

Referring again to Figure 1, the projecting end portions 16ª and 17ª of these fenders or mud guards 16 and 17 are made separate from the main body portions thereof. These separate end portions or sections thus comprising the portions of the fenders exposed to the greatest danger of collision and damage form substantially end extensions for the main body portions of the fenders and are removable therefrom and replaceable, as will be described. The main body portion of the forward fender 16 may extend, for example, to substantially a point 16ᵇ and the main body portion of the rear fender 17 may extend, for example, to substantially a point 17ᵇ, the remaining end portions of the fenders comprising the removable extensions 16ª and 17ª.

In Figures 2–7 there is illustrated the manner in which the extension 16ª of the forward fender 16 is preferably joined with the main body portion of the fender, and it will be understood that the rear fender 16 and its extension 17$^a$ are preferably joined together in a similar manner. Referring now to Figures 2 and 3, the extension 16$^a$ is seen to be of a size, curvature and design to correspond substantially with the main body portion of the fender and preserve the continuity of design. Preferably this extension 16$^a$ telescopes within and beneath the forward end of the body portion of the fender, being tightly held therein, as will be described, to prevent rattling and removable therefrom for replacement if desired.

Considering first the outer edge of the fender, that is, its edge remote from the body of the car, the main portion of the fender is provided as in the usual construction, with a depending flange 16$^c$ which lends rigidity to the fender and at the same time adds to its appearance. The outside edge of the extension 16$^a$ is provided with a similar and corresponding depending flange 16$^d$. Adjacent its forward end the flange 16$^c$ of the main fender portion is provided with an extension or what might be termed a flap 16$^e$, which is bent inwardly and upwardly back upon itself in substantially U-shape, forming a longitudinal groove as is best brought out in Figures 6 and 7. Within this groove formed by the flap 16$^e$ is received the end portion of the flange 16$^d$ of the extension 16$^a$. The end portion of this flange 16$^d$ is preferably gradually tapered having a width increasing forwardly from its rear end so that upon being forced into the space between the parts 16$^c$ and 16$^e$ it wedges tightly therein.

The inside edge of the main fender portion 16, that is, the edge nearest the body of the car is provided with a depending flange 16$^f$ similar to the flange 16$^c$ on the outside edge thereof. The forward end portion of this flange 16$^f$ is provded with a downward extension or flap 16$^g$ which is folded inwardly and upwardly back upon itself in a manner corresponding to that in which the flap 16$^e$ of the outer flange 16$^c$ is bent. The inside edge of the extension 16$^a$ is provided with a depending flange 16$^h$ corresponding to the flange 16$^f$ and the end portion of this flange 16$^h$ is adapted to wedge in between the parts 16$^f$ and 16$^g$ of the main fender portion 16. The end portion of the flange 16$^f$ is tapered in the same manner as is the end portion of the flange 16$^d$ so that a firm wedging connection is had between the main body of the fender 16 and the extension 16$^a$ at either side thereof.

The apron 18 which, as above described, extends from the inside edge of the fender down to the frame of the vehicle is joined to the main fender portion 16, for example, as shown in Figure 6, a depending flange 18$^a$ thereof being spot welded or otherwise secured to the flange 16$^f$ substantially throughout its length. The forward portion of the apron 18 extends beyond the end of the body portion of the fender 16 along the extension 16$^a$. The flange 18$^a$ of the apron extends to its end and at its portion beyond the forward end of the main fender body 16 is provided with an extension or flap 18$^b$ which is bent inwardly and back upon itself in a curved contour, as is shown in Figures 5 and 7, thus forming with the flange 18$^a$ a channel having a rounded inner wall. The portion of the flange 16$^h$ of the extension 16$^a$ which rests in this channel is bulged outwardly to coact therewith, as best shown at 16$^i$ in Figure 5. It will be seen that the flanged portion 16$^i$ of the extension 16$^a$ interlocks with the portions 18$^b$ and 18$^a$ of the apron 18, wedging into interlocking relation therewith in both a vertical direction and a lateral direction. This wedging action in two directions provides for a snug connection between the extension 16$^a$ and the apron 18 avoiding any possibility of looseness and rattling.

The fenders shown in the drawing are illustrative of the usual type of crown fenders, that is, fenders the upper surface of which arches upwardly from either side in a gradual curve. By reference to Figures 2 and 3, it will be seen that the rear end portion of the extension 16$^a$ which telescopes within the flanges of the main fender portion 16 is gradually tapered both inwardly at its sides and downwardly at its top, so that when the extension is forced into the end of the body portion it wedges into interlocking relation therewith in two directions, namely, substantially in a vertical direction with respect to the plane of the fender and in substantially a lateral direction with respect to the plane of the fender. The further that the extension is thrust into the end of the main fender portion the tigter it jams, due to this wedging action, securely interlocking therewith.

Referring to Figure 8, there is preferably employed a tension spring 21 which continually urges the extension 16$^a$ into the main fender portion 16, thus tending always to increase the wedging and tightening action. This spring may be secured at one end to a suitable hook 22 mounted upon the supporting bracket 20, and at its other end may connect with a hooked portion 23 bent downwardly from the end portion of the extension member 16$^a$. Should the connection between the extension and the main fender tend to loosen by continual vibration and resulting wear, the spring 21 automatically takes up the looseness and maintains the parts in tightly jammed wedging relation.

As has been mentioned above, the two fender extensions or removable end portions 16$^a$ and 17$^a$ are preferably joined to their respective main fender portions in substantially the same manner. These removable end portions are preferably made of a metal which is slightly more yielding and susceptible to bending and breakage than is the material of the main fender portions 16 and 17. These removable extensions, therefore, if struck, as in a collision, will yield and absorb the shock of the collision, protecting the remaining portions of the fenders from harm. The damage is thus confined to the relatively small and easily removable parts. Damaged portions may conveniently be removed by sliding them out of their interlocking relation with the main fender portion and may be replaced and the damage thus repaired without necessitating replacement of an entire fender.

If desired, the junction between the main fender portion and the removable extension may be along a diagonal line, as indicated in Figure 9, for example. This provides for a greater length of removable portion at the outer edge of the fender than at the inner edge. This construction is advantageous since automobile fenders adjacent their ends are frequently struck from the side and thereby bent or broken.

From the above, it will be seen that there is herein provided a construction which embodies the features of this invention and attains the objects thereof, including many important practical advantages.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In fender construction for motor vehicles, a fender comprising a main body portion and an end portion removable therefrom and normally in interlocking relation therewith, one of said parts having engaging surfaces diverging in the direction of their relative movement between which surfaces the other part is wedged.

2. In construction for motor vehicle fenders, in combination, a fender comprising a main body portion and a removable end extension, a resilient member interposed between said body portion and extension, and means connecting said resilient member with said body portion and extension to adapt it to tend to draw the same together.

3. In construction for motor vehicle fenders, in combination, a fender comprising a main body portion and a removable end extension, a bracket supporting said main body portion in connection with the frame of the vehicle, and means coacting with said bracket removably securing said extension in relation to said body portion.

4. In construction for motor vehicle fenders, in combination, a main fender portion having side flanges formed adjacent its end, and a removable extension for said fender having flanges in interlocking relation with said flanges of said main portion, the engaging surfaces on one of said members diverging in the direction of the other member whereby they are wedged into assembled position.

5. In construction for motor vehicle fenders, in combination, a main fender portion, and an end extension therefor removable therefrom and telescopically related thereto, the engaging surfaces of said main portion and extension being so shaped and related as to tend to wedge in both a vertical and a horizontal direction, and releasable means holding said main portion and extension together.

6. In construction for motor vehicle fenders, in combination, a main fender portion, an apron extending between said fender and the body of the vehicle, and a removable end extension for said fender secured to said main portion and to said apron.

7. In construction for motor vehicle fenders, in combination, a main fender portion, an apron extending between said fender and the body of the vehicle, and an end extension for said fender removably interlocking with said main portion and with said apron.

8. In construction for motor vehicle fenders, in combination, a main body portion secured in permanent fashion to the motor vehicle and having a crowned contour, and a second portion of similar crowned contour interfitting with said first portion and removable therefrom, said second portion being formed of a metal more yielding than said first portion whereby there is a tendency to guard said first portion from injury.

9. In construction for motor vehicle fenders, in combination, a main body portion secured to the motor vehicle, and an end portion interlocked with said main body portion and removable therefrom, said end portion being constructed of metal more susceptible of damage and relatively more yielding than that of said main body portion.

10. In construction for motor vehicle fenders, in combination, a fender comprising a permanent main body portion with a removable extension both curved transversely and longitudinally and similar in general width and shape to each other throughout their length, said body portion and extension being provided with side flanges and being telescopically disposed with relation one to the other, and releasable securing means holding said extension against sliding outwardly from its removable position.

11. In construction for motor vehicle fenders, in combination, a fender comprising a permanent main body portion with a removable extension both curved transversely and longitudinally and similar in general width and shape to each other throughout their length, said body portion and extension being provided with side flanges and being telescopically disposed with relation one to the other, and releasable securing means holding said extension against sliding outwardly from its removable position, the engaging surfaces on one of said parts diverging in the direction of the other part and having the other part wedged therebetween.

12. In construction for motor vehicle fenders, in combination, a fender comprising a permanent main body portion with a removable extension both curved transversely and longitudinally and similar in general width and shape to each other throughout their length, said body portion and extension being provided with side flanges and being telescopically disposed with relation one to the other, and releasable securing means holding said extension against sliding outwardly from its removable position, said extension being formed of a material more yielding and more susceptible to damage than said body portion whereby it tends to localize in itself damage to the fender.

13. In construction for motor vehicle fenders, in combination, a fender comprising a permanent main body portion with a removable extension both curved transversely and longitudinally and similar in general width and shape to each other throughout their length, said body portion and extension being provided with side flanges and being telescopically disposed with relation one to the other, the engaging surfaces on one of said parts diverging in the direction of the other part and having said part wedged therebetween, and resilient means connecting said body and extension and tending to draw them together.

14. In construction for motor vehicle fenders, in combination, a fender comprising a main body portion and an extension similar in general width and shape thereto, said body portion and extension being transversely curved and flanged at their sides, and a yielding device connected to urge said extension toward said body portion.

15. In construction for motor vehicle fenders, in combination, a fender comprising a main body portion and an extension similar in general width and shape to the body portion, said parts being transversely curved and provided with flanges at their sides and overlapping one another along a surface which is inclined in such direction as to give the extension a greater length on its outer than on its inner side.

In testimony whereof, I have signed my name to this specification this 23rd day of January, 1925.

ROBERT S. BLAIR